(12) United States Patent
Lev

(10) Patent No.: US 9,326,325 B2
(45) Date of Patent: Apr. 26, 2016

(54) TOWEL WARMER

(71) Applicant: Mordechai Lev, West Bloomfield, MI (US)

(72) Inventor: Mordechai Lev, West Bloomfield, MI (US)

(73) Assignee: SIDUS TECHNOLOGIES, INC., West Bloomfield, MI (US)

( * ) Notice: Subject to any disclaimer, the term of this patent is extended or adjusted under 35 U.S.C. 154(b) by 154 days.

(21) Appl. No.: 13/722,956

(22) Filed: Dec. 20, 2012

(65) Prior Publication Data

US 2013/0153560 A1 Jun. 20, 2013

Related U.S. Application Data

(60) Provisional application No. 61/577,968, filed on Dec. 20, 2011.

(51) Int. Cl.
*H05B 3/06* (2006.01)
*H05B 3/34* (2006.01)

(52) U.S. Cl.
CPC .. *H05B 3/06* (2013.01); *H05B 3/34* (2013.01); *H05B 3/342* (2013.01); *H05B 2203/003* (2013.01); *H05B 2203/014* (2013.01)

(58) Field of Classification Search
None
See application file for complete search history.

(56) References Cited

U.S. PATENT DOCUMENTS

| | | | | |
|---|---|---|---|---|
| 1,914,190 A * | 6/1933 | Herr | | 219/521 |
| 2,156,784 A * | 5/1939 | Jensen | | 432/185 |
| 2,481,050 A * | 9/1949 | Starnes | | 219/521 |
| 2,567,434 A * | 9/1951 | Hoskings | | 219/520 |
| 2,980,058 A * | 4/1961 | Hoffman | | 119/28.5 |
| 3,017,493 A * | 1/1962 | Cooke | | 219/537 |
| 3,125,663 A * | 3/1964 | Hoffman | | 219/217 |
| 3,443,067 A * | 5/1969 | Morgan | | 219/529 |
| 3,621,192 A * | 11/1971 | Pohler | | 219/217 |
| 4,117,309 A | 9/1978 | Cayley | | |
| 4,559,442 A | 12/1985 | Graham | | |
| 4,927,995 A | 5/1990 | Lovett et al. | | |
| 5,516,189 A * | 5/1996 | Ligeras | | 297/180.11 |
| 5,548,100 A * | 8/1996 | Miller | | 219/521 |
| 5,592,750 A | 1/1997 | Eichten | | |
| RE35,834 E * | 7/1998 | Miller | | 219/521 |
| 5,842,287 A | 12/1998 | Murphy | | |
| 6,080,974 A * | 6/2000 | Ambrosiano | | 219/544 |
| 6,116,437 A | 9/2000 | Rowe | | |
| 6,153,862 A | 11/2000 | Job | | |
| 6,604,942 B2 | 8/2003 | Sharp | | |
| 6,774,343 B2 | 8/2004 | Ibanez | | |
| 6,922,911 B2 * | 8/2005 | Lam | | 34/239 |
| 7,009,155 B1 * | 3/2006 | Fan | | 219/538 |
| 7,036,670 B2 * | 5/2006 | Lam | | 211/85.3 |
| 7,039,304 B2 * | 5/2006 | Gerhardinger et al. | | 392/435 |
| 7,438,356 B2 * | 10/2008 | Howman et al. | | 297/180.11 |

(Continued)

*Primary Examiner* — Joseph M Pelham
(74) *Attorney, Agent, or Firm* — Avery N. Goldstein; Blue Filament Law

(57) ABSTRACT

A towel warmer is provided that has a frame assembly and one or more heating fabric sleeves affixed to the frame assembly. The heating fabric sleeves have electric heating wires that when connected to an electrical power supply to produce a more uniform heat transfer to a contacting article such as a towel than a conventional towel warmer. A thermostat is optionally provided to moderate sleeve temperature. Additionally, a controller is optionally provided to adjust operating parameters of the thermostat. A kit is also provided that includes the towel warmer partially disassembled and instructions for assembly of the frame assembly and attaching the one or more heating fabric sleeves to the frame assembly.

19 Claims, 11 Drawing Sheets

(56) References Cited

U.S. PATENT DOCUMENTS

| | | | |
|---|---|---|---|
| 7,491,912 B1 * | 2/2009 | Check | 219/386 |
| 7,816,628 B2 * | 10/2010 | Fernandez et al. | 219/211 |
| 7,866,743 B1 * | 1/2011 | Russell et al. | 297/180.12 |
| 8,388,056 B2 * | 3/2013 | Smith et al. | 297/180.12 |
| 8,864,221 B1 * | 10/2014 | Delvilla | 297/31 |
| 2006/0051079 A1 * | 3/2006 | Gerhardinger et al. | 392/435 |
| 2009/0230119 A1 * | 9/2009 | Dupont | 219/521 |
| 2011/0072682 A1 * | 3/2011 | Beckett | 34/621 |
| 2011/0186558 A1 * | 8/2011 | Campbell | 219/201 |
| 2012/0211481 A1 * | 8/2012 | Huang | 219/213 |
| 2013/0097897 A1 * | 4/2013 | Hem | 38/140 |

* cited by examiner (A)

(B)

(C)

(D)

TOWEL WARMER

CROSS-REFERENCE TO RELATED APPLICATIONS

This application is a non-provisional application that claims priority benefit of U.S. Provisional Application Ser. No. 61/577,968, filed Dec. 20, 2011 the contents of which are hereby incorporated by reference.

FIELD OF THE INVENTION

The present invention in general relates to towel warmers and heated shelving, and in particular to a flexible heated cover material draped, laid on, or attached to a frame.

BACKGROUND OF THE INVENTION

The feel of a warm towel against the skin immediately after a shower or a bath is a pleasurable experience and eases the transition one feels as they transition from the warm shower or bath to the cooler ambient air.

A warmed towel serves to offset the well known chilling effect due to evaporation of water from the body after showering, even at normal room temperatures. Furthermore, numerous circumstances arise, especially in chilly environments, where the convenient availability of a warmed towel whenever needed could become an important factor in the well-being, health or survival of individuals who may be frail or under medical treatment, and thus vulnerable to thermal shock between showering (or bathing) and drying. Additionally towel warmers not only warm and/or dry textiles to enhance comfort, but also prevent prolonged dampness in articles of clothing or towels that could promote growth of mold or mildew. Thus the consistent use of towel warmers in bathrooms has a positive impact on indoor air quality.

However, the sensation of a warm towel is typically only enjoyed in one's home, because one has managed to complete a shower shortly after having run a load of towels through a washer and dryer.

Existing towel warmers are generally constructed as a series of horizontal bars that contain a heating mechanism, or as an enclosure in which hot air is blown or forced into to warm or dry towels, fabrics, or articles of clothing. As shown in FIG. 1, a series of horizontal bar electric towel warmers are depicted. In prior art FIGS. 1A-1C wall mountable towel warmers are shown, while prior art FIG. 1D shows a floor mounted electric towel warmer.

However, the available tower warmers of FIG. 1A-1D inherently do not provide even or total heating to the surface of a towel. In towel warmers that depend on horizontal heating bars to warm a towel, only the small portion of the towel that physically contacts the heating bars is warmed efficiently while the other portions are only slowly warmed through thermal air gradients. Typically only 10% of the surface area of the towel is heated via the heating bars, and the promise of warm towel is not delivered to consumers' satisfaction unless the heating bars or rails are more numerous with a significantly higher density which requires a higher cost of materials and manufacture, including expensive chrome-plated, bent metal technology. In general, the prior art towel warmer designs lead to a high level of customer dissatisfaction. The high consumer dissatisfaction leads to a greater number of product returns, and results in instances of undesired holes left in consumer bathroom walls after returning the product to the store, thereby contributing to further levels of consumer dissatisfaction. Furthermore, the partial application of heat to areas of a towel is not an effective method to achieve even and total heating of a towel. In part, this results because cotton is an excellent insulator, and the most common material from which towels are made. The thermal conductivity of cotton is one half that of asbestos, and one tenth of window glass. As a result, the most efficient method of heating a towel is total immersion of each individual cotton fiber in a heated medium or enclosure: a process that is both cumbersome and impractical in many settings.

Additional disadvantages of conventional horizontal bar electric towel warmers include construction from large amounts of heavy and costly metal, pre-assembly at the factory that leads to larger packaging and higher shipping costs, high energy consumption for low efficiency heating, and difficulty in cleaning.

Thus, there exists a need for a towel warmer that provides even and uniform surface that provides total warming to a towel, fabric, or article of clothing, while being less costly and cumbersome than existing towel warmers.

SUMMARY OF THE INVENTION

A towel warmer is provided that has a frame assembly and one or more flexible heating fabric sleeves affixed to the frame assembly. The heating fabric sleeves have electric heating wires that when connected to an electrical power supply to produce a more uniform heat transfer to a contacting article such as a towel than a conventional towel warmer. A flexible external slip cover is also provided that fits over the heating fabric sleeves. The flexible nature of the heating fabric sleeves and external slip covers allows for fitting to straight horizontal or vertical surfaces, as well as curved or non-planar surfaces. A thermostat is optionally provided to moderate sleeve temperature. Additionally, a controller is optionally provided to adjust operating parameters of the thermostat that is user programmable.

A kit is also provided that includes the towel warmer partially disassembled and instructions for assembly of the frame assembly and attaching the one or more heating fabric sleeves to the frame assembly.

DETAILED DESCRIPTION OF THE PREFERRED EMBODIMENTS

The present invention has utility as a towel warmer that provides even and uniform heated surfaces and total warming to a towel, fabric, article of clothing or other article placed in contact or proximity therewith. An inventive article has the illustrative advantages of being less costly to ship and cumbersome to install as compared to conventional towel warmers. Embodiments of the innovative towel warmer are built on a mechanical construction or frame, formed of various materials illustratively including, various metals, plastics, or composite type materials such as fiberglass. The mechanical construction is made up of vertical, horizontal, and curved members that may be hollow or solid. Portions of the mechanical construction are covered with one or more electronically heated flexible fabric sheets that form a heated cover material sleeve, the sleeve is draped (laid on) and attached to one or more vertical, horizontal, and curved non-planar portions of the frame. The electronically heated fabric sheets contain heating wires that provide the heating function of the towel warmer. The electronically heated fabric sheets are sewn or joined with fasteners, zippers, or snaps into a sleeve shape that are fitted or draped (laid) over the vertical, horizontal, and curved non-planar portions of the frame.

An "article" is defined herein as a towel, fabric, article of clothing, bath mat, rug, or other household goods.

In embodiments of the inventive towel warmer, the entire flexible fabric of the sleeve is heated thereby providing an even and full heating coverage versus only the horizontal bars in the existing art (i.e., partial heating coverage as was described with respect to prior art FIGS. 1A-1D). In embodiments, the even heated contact surfaces of the heated sleeves thus provide a more effective and faster heating to fabrics or towels that are in contact with the sleeves. Embodiments of the towel warmer provide up to ten times more heated surface area than existing heating bars or rails of existing designs.

The innovative construction of embodiments separates the supporting structure or construction from the heating part that is formed in the flexible fabric sleeve, which allows for the user to easily assemble the towel warmer, thereby lowering manufacturing and shipping costs, and providing a lower end cost to the user. The modular construction of the innovative towel warmer may also facilitates customization, and provides additional configuration options that may not be available with the existing available towel warmers. The inventive flexible heating fabric surface components are cleanable, and may be designed with many different surface pattern options to better fit intended bathroom decors versus the current art that is typically only available in chrome.

Figure 1:
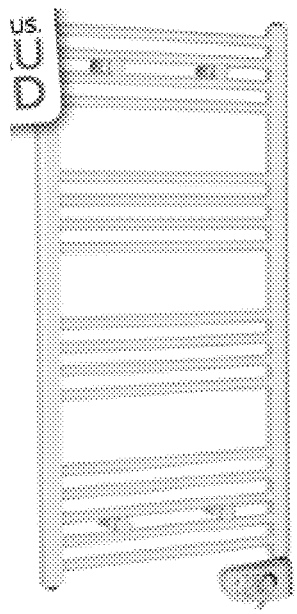
FIGS. 1A-1D are perspective prior art views of towel warmers.
Figure 1:
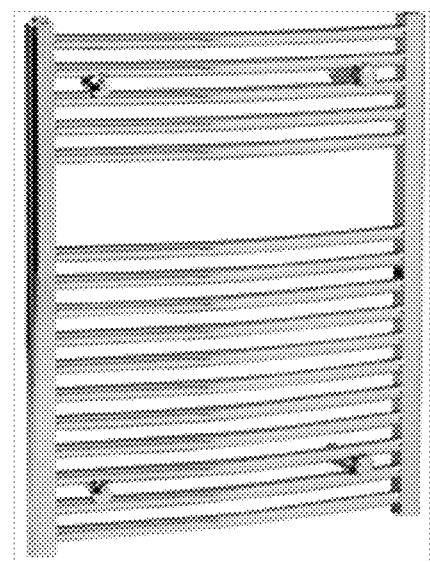
Figure 1:
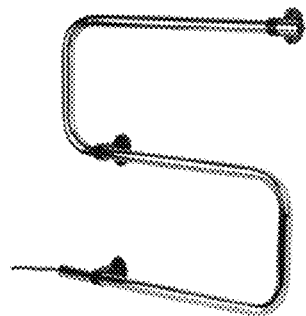
Figure 1:
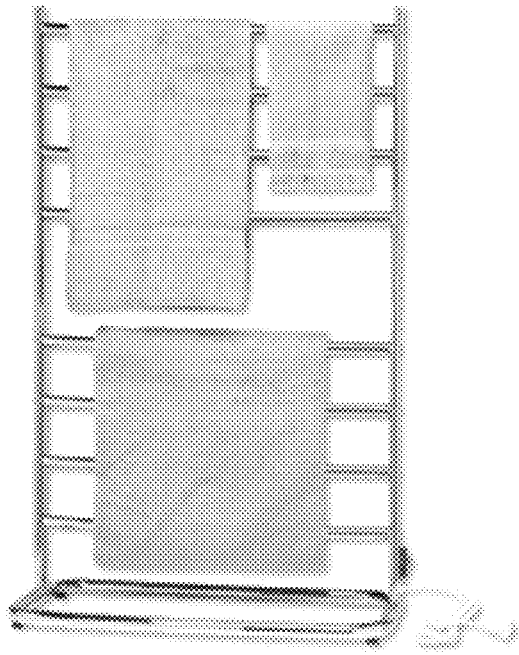
Figure 2A:
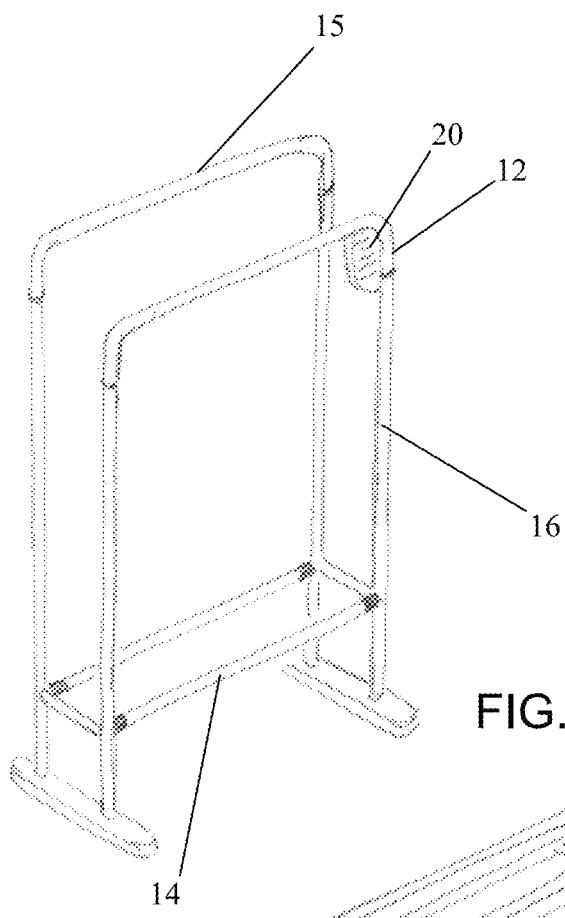
FIG. 2A is a perspective view of an embodiment of an assembled frame for a multiple towel freestanding floor towel warmer.
Figure 2B:
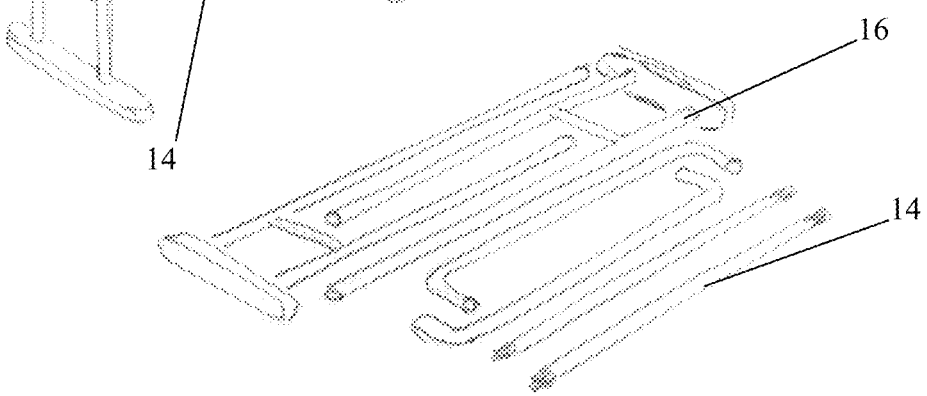
FIG. 2B is a perspective view of an embodiment of the frame for the multiple towel freestanding floor towel warmer of FIG. 2A prior to assembly and ready for shipment.
Figure 3:
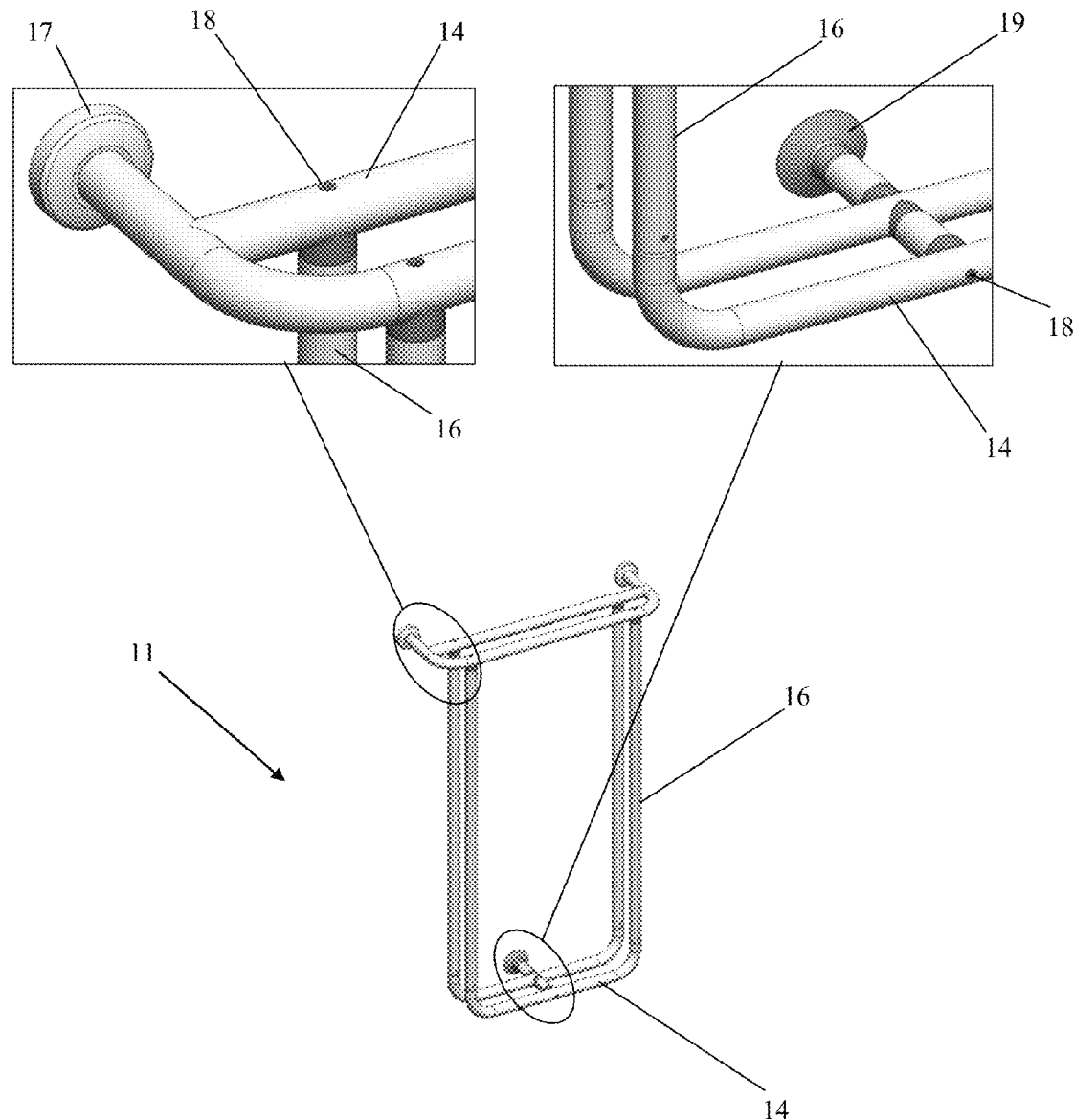
FIG. 3 is a perspective view of an embodiment of a wall mountable multiple towel warmer highlighting assembly points and connections.
Figure 4:
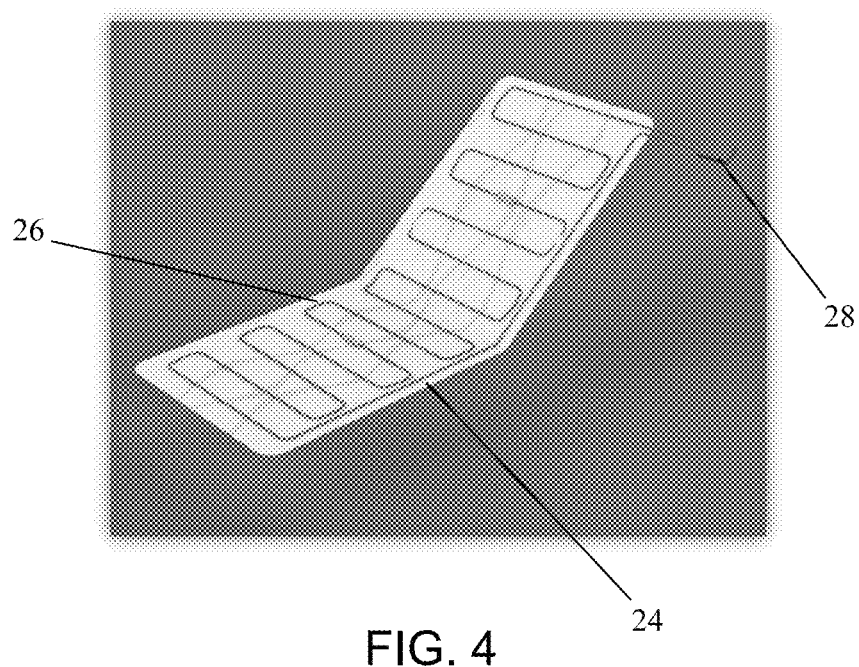
FIG. 4 is a perspective view of an embodiment of an electrically heated fabric prior to being sewn or joined into a sleeve shape.
Figure 5:
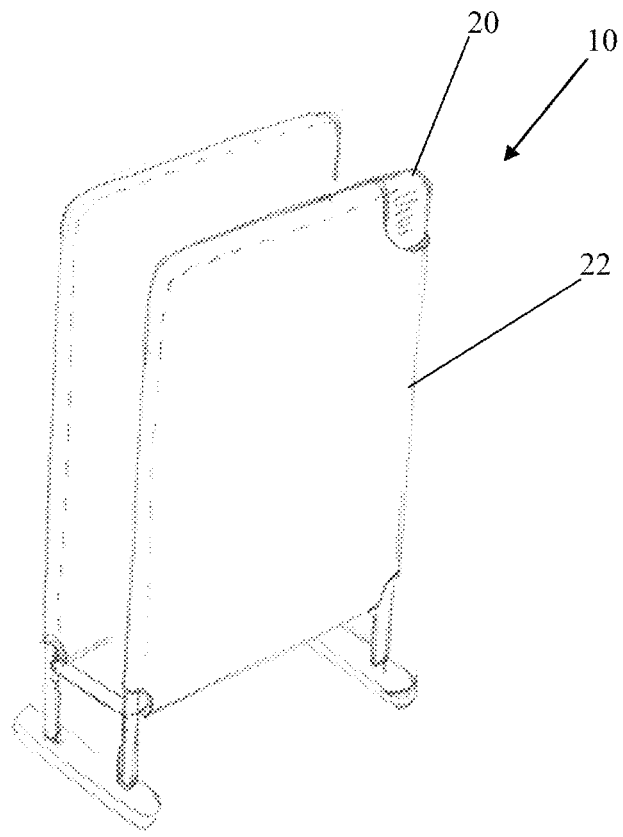
FIG. 5 is a perspective view of an embodiment of the electrically heated fabric of FIG. 4 draped and attached to the assembled frame for a multiple towel freestanding floor towel warmer of FIG. 2A.
Figure 10A:
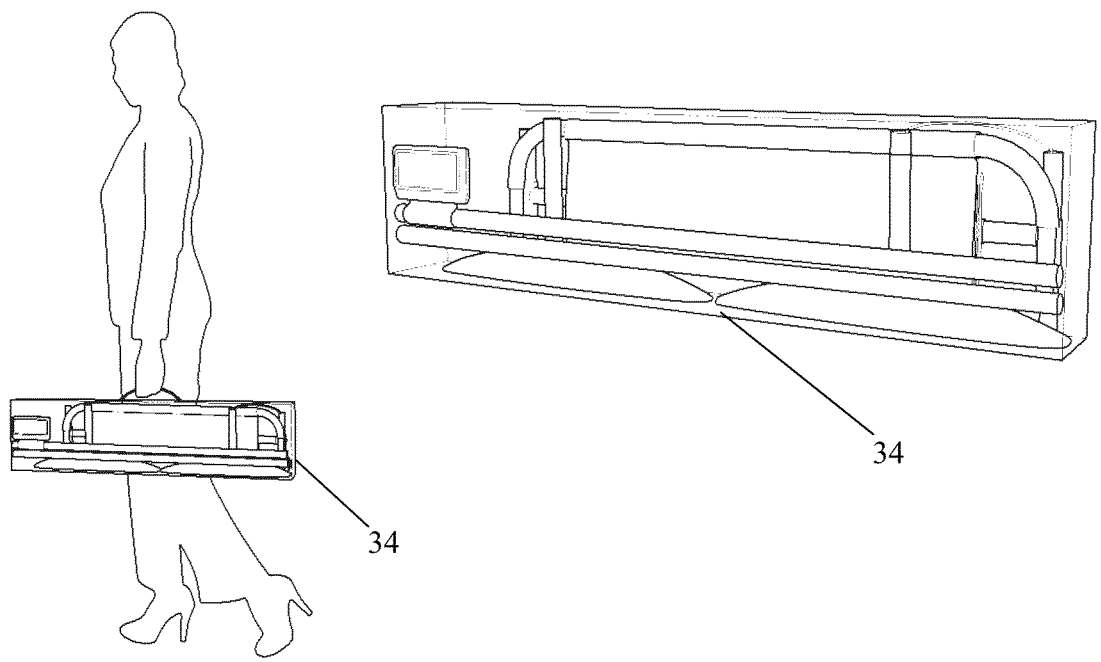
FIG. 10A is a perspective view of a knock down of a floor standing embodiment of a towel warmer of FIG. 10B.
Figure 10B:
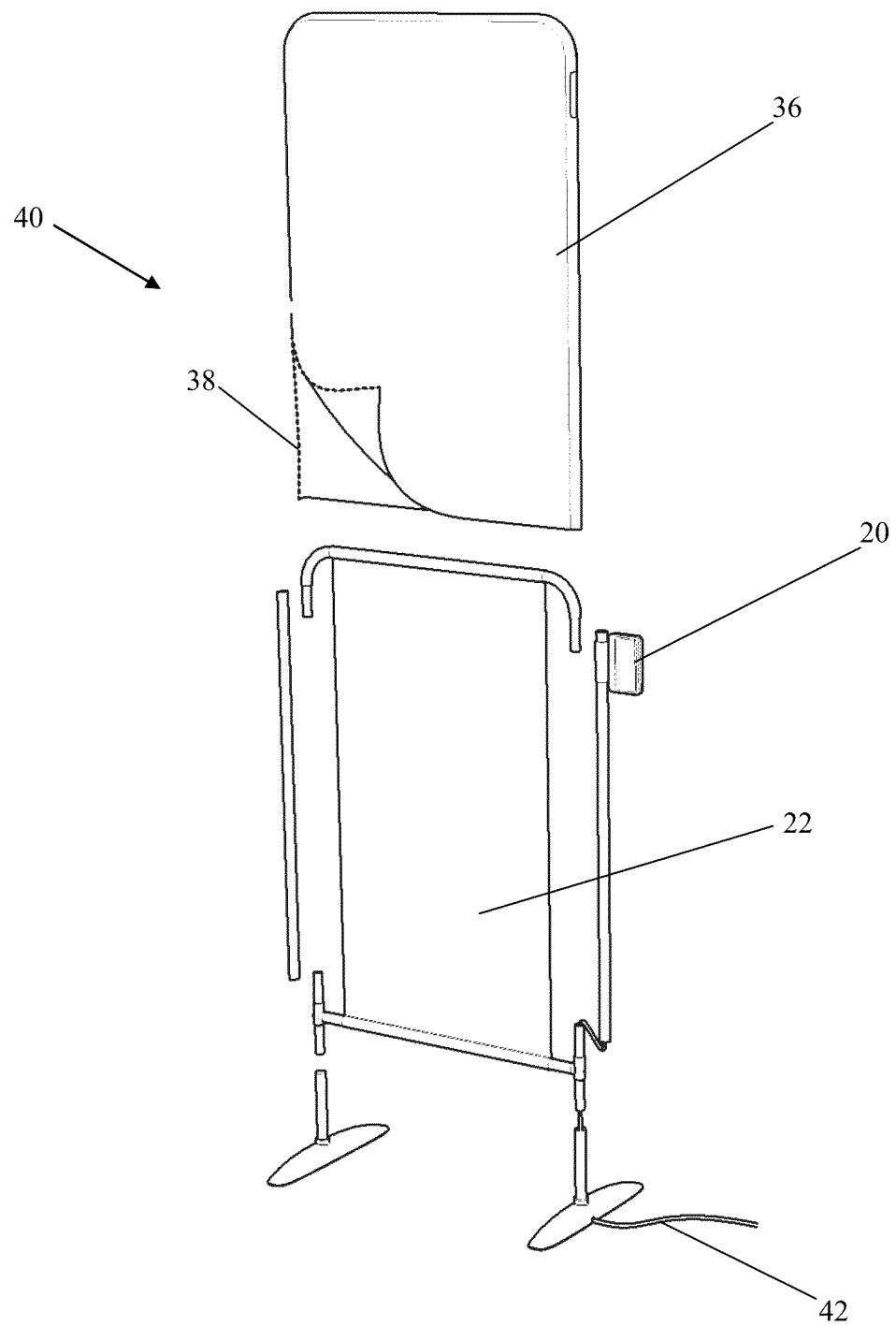
FIG. 10B is an exploded view of an embodiment of a floor standing towel warmer illustrating a fabric cover applied over a heated fabric.

Referring now to FIGS. 2 to 5, an embodiment of the towel warmer is depicted; the towel warmer is shown generally at 10 in FIG. 5. In FIG. 5, the towel warmer 10 is a multiple towel, freestanding floor towel warmer. The towel warmer 10 is formed with a frame 12 made up of horizontal members 14, curved members 15, and vertical members 16 that may be joined with fasteners 18 as shown in FIGS. 2A and 3. Alternatively, the horizontal 14, curved 15, and vertical member 16 may be press fit or snapped fitted together. FIG. 2B illustrates the parts that form the frame 12 of the inventive towel warmer 10, as the horizontal and vertical parts may appear prior to assembly by a user. Optionally, various frame configurations may be pre-assembled for the user to install in various configurations to be described further below with respect to FIGS. 6 to 8. The warmer 10 is readily supplied with a frame assembly component of horizontal members 14 and vertical members 16 and the one or more fabric sleeves 24, along with instructions for assembly of the frame assembly 12 and attaching the one or more heating fabric sleeves 24 to said frame assembly 12. FIG. 10A is a knocked down for user assembly kit 34 for a towel warmer such as shown in FIG. 10B and described further below. The small package size of the assembly kit 34 provides for easy transport of the towel warmer, and for efficient storage and retail display of the assembly kit 34. The small package size allows for three times the product to be displayed on the same retail shelf, while allowing easy to carry through and out from the store.

FIG. 3 illustrates the wall mount configuration for a two towel hanging warmer 11 with only two wall mount drill points required for attaching the towel warmer 11. The drill points for wall attachment are engage with screws at terminations 17, while attachment point 19 in forms including a suction cup, double sided adhesive or non-adhesive spacing component serves as a connector that does not require drilling. Prior art towel warmers require four drill points for wall attachment.

Figures 11A, 11B:
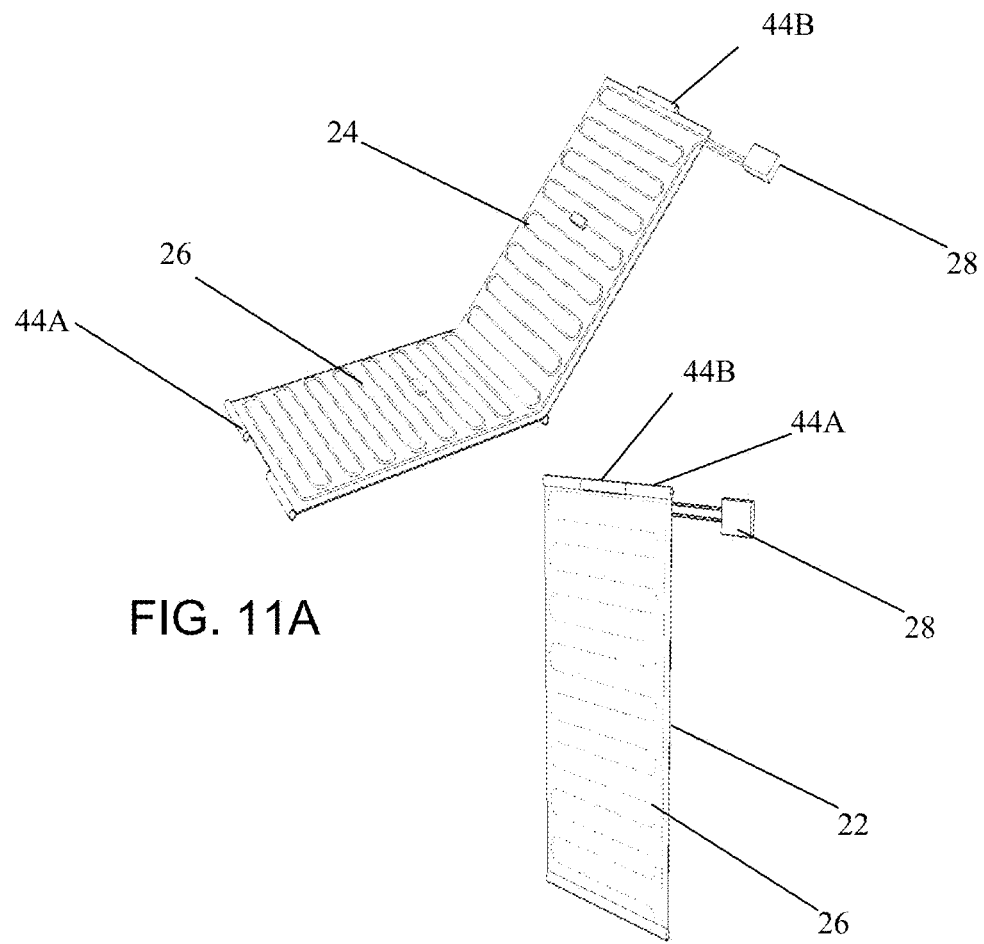
FIGS. 11A and 11B are perspective views of an embodiment of an electrically heated fabric prior to being folded into a sleeve shape.

FIGS. 4, 11A and 11B are perspective views of an embodiment of an electrically heated fabric 24 prior to being sewn or joined together with snaps, buttons, zippers, or other fasteners into a sleeve shape 22 that is draped over the frame 12. The heated fabric 24 is joined or impregnated with an embedded heating wire 26. The temperature of the heating wires is optionally controlled with a thermostat or controller 20. Alternatively, the temperature is optionally controlled by heating wire formed with self-regulated heating wire commonly called Positive Temperature Coefficient (PTC) wire, thereby eliminating the need for a thermostat. The entire fabric 24 is heated and provides for a complete and even transfer of heat to towels or other material articles placed in physical contact with the fabric 24 forming heating sleeve 22. The nature of the heat transfer of the heating fabric 24 is advantageous to the only small segments of a towel that are warmed in the heated bar approach, which heats up only segments or portions of the towel. The heating fabric 24 is cleanable, and is readily formed with many different textures, indicia, and fabric patterns to fit with many bathroom decors. The outer surface of heating fabric 24 is water resistant or waterproof, and is optionally treated with antimicrobial agents. Electrical connector 28 may be joined to controller 20.

Figure 6A:
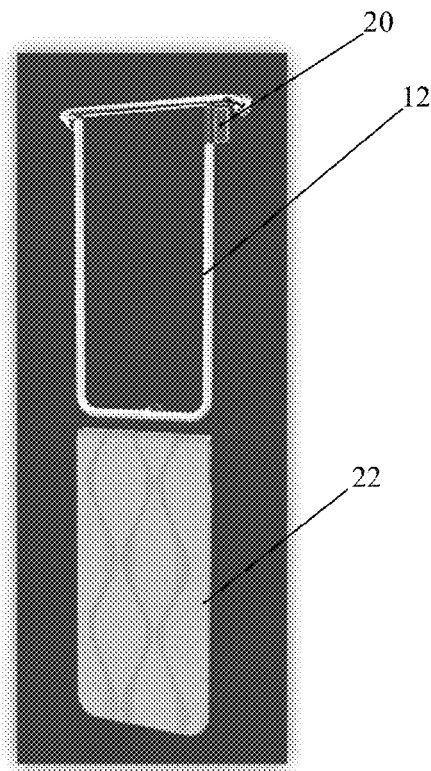
FIGS. 6A and 6B are perspective views of an embodiment of a single towel wall mounted towel warmer prior to and after attaching the electrically heated fabric sleeve, respectively.
Figure 6B:
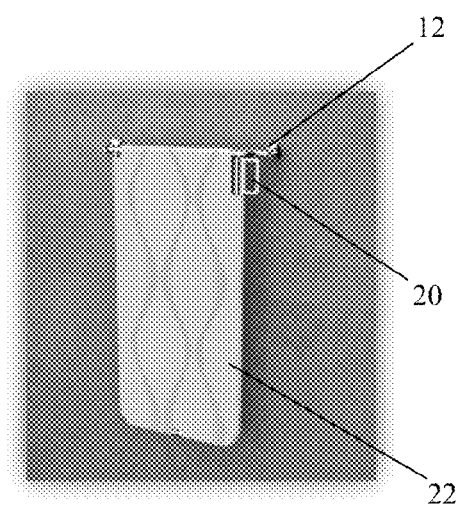

FIGS. 6A and 6B are perspective views of an embodiment of a single towel wall mounted towel warmer prior to, and after attaching the electrically heated fabric sleeve 22, respectively.

Figure 7A:
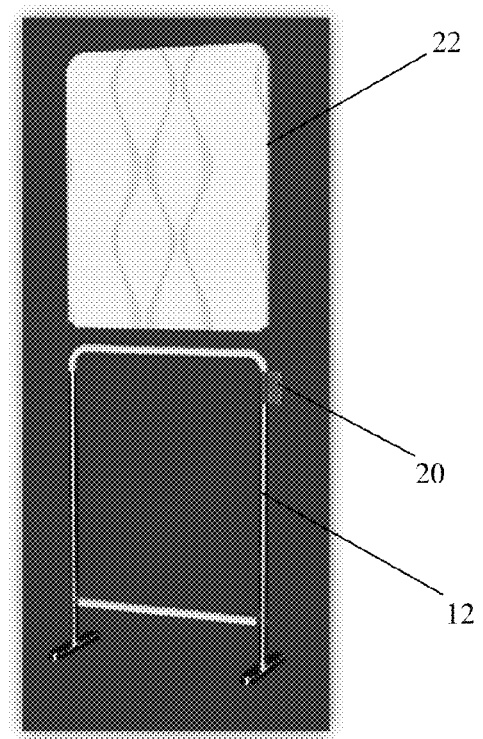
FIGS. 7A and 7B are perspective views of an embodiment of a single towel free standing floor towel warmer prior to and after attaching the electrically heated fabric sleeve, respectively.
Figure 7B:
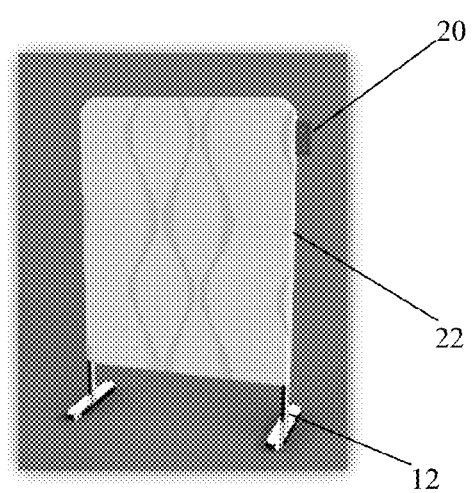

FIGS. 7A and 7B are perspective views of an embodiment of a single towel free standing floor towel warmer prior to, and after attaching the electrically heated fabric sleeve 22, respectively.

Figure 8:
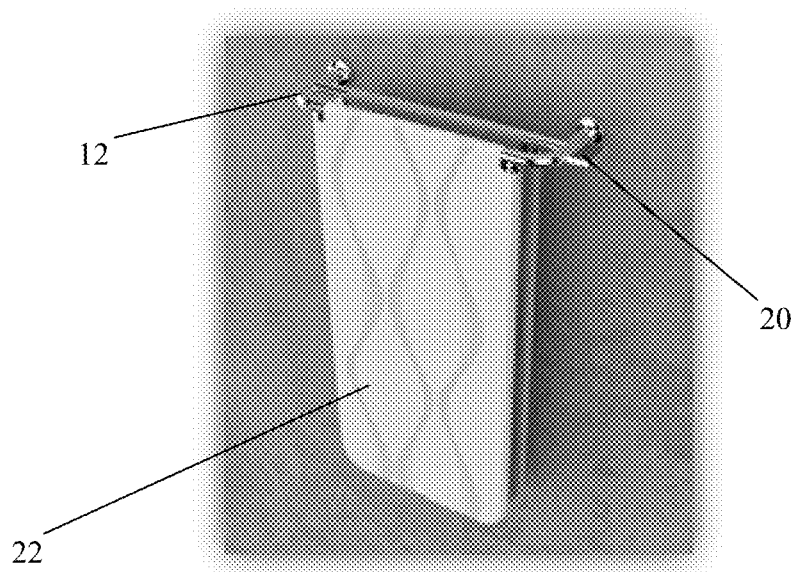
FIG. 8 is a perspective view of an embodiment of a multiple towel freestanding wall mounted towel warmer.

FIG. 8 is a perspective view of an embodiment of a multiple towel freestanding wall mounted towel warmer.

Figure 9:
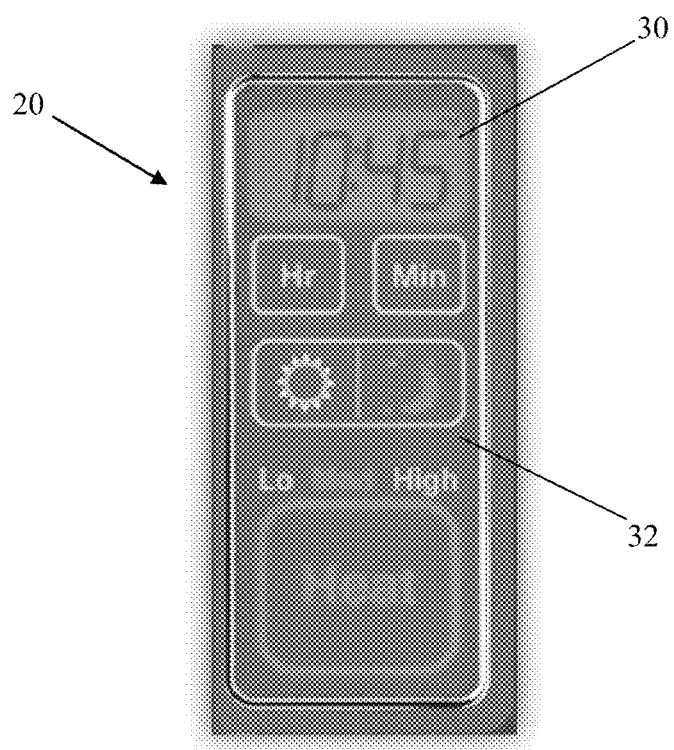
FIG. 9 is a perspective view of an embodiment of a controller for embodiments of the towel warmer.

FIG. 9 is a perspective view of an optional controller display 30 and interface 32 for a controller 20 for embodiments of the inventive towel warmer. The controller 20 is user programmable. The display 30 optionally provides a user with the current time, temperature of the heating element, or the temperature of the ambient air within the room. A user may use the interface 32 to set operating parameters such as a desired temperature range (e.g., low, medium, high), or set a programmable timer to automatically start to pre-warm the warmer 10 and one or more articles that are hung on the inventive towel warmer 10 in advance of anticipated usage, such as post-bath drying. A separate day and night setting are optionally set as signified by the sun and moon. In addition, a drying function is optionally provided to establish a period of time that may be set to continue to dry a towel following a shower. The controller 20 may optionally also have an auto off feature, and multiple timer settings, for example one hour, two hours, or other finer timer intervals.

FIG. 10B illustrates an exploded view of a floor standing towel warmer 40 with an electrically heated fabric sleeve 22 mounted to a frame and an external flexible slip cover 36 with a zipper 38 or other fasteners, and an electrical cord 42. The external slip cover 36 is flexible, and fits over the electrically heated fabric sleeve 22 and is water resistant and optionally is treated with antimicrobial agents. The external slip cover may be a flexible two ply fabric with an inner layer that is water proof. The outer layer of the slip cover 36 may be washable or stain resistant, with various graphical designs that may be chosen during purchase of the towel warmer. As both the electrically heated fabric sleeve 22 and the external slip cover 36 are flexible, both covers (22, 36) may contour or fit to both planar and curved surfaces. As shown in the embodiments of FIGS. 4-8, the heated fabric 24 is joined or impregnated with an embedded heating wire 26 to form a slip-on cover, whereas the embodiments of FIGS. 10-12 separate the heating element from the fabric cover, with the heated fabric sleeve 22 and the external slip cover 36. FIG. 11A is an unfolded view of the heating fabric 24 and electrical connector 28 prior to folding over the frame of the towel warmer, where the top bar fits through complementary loops 44A and 44B. FIG. 11B shows the heated fabric 24 folded to form heating sleeve 22.

Figure 12A:
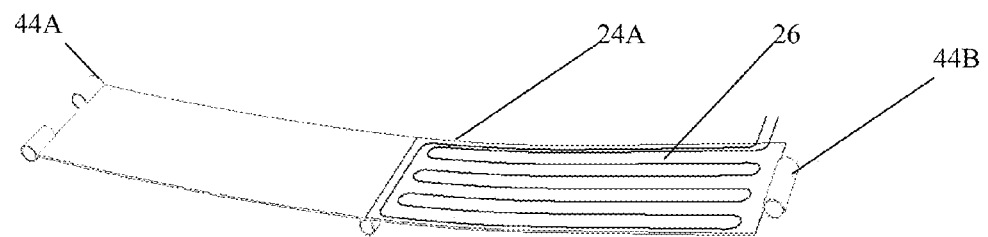
FIGS. 12A-12D illustrate an embodiment of a towel warmer with a heated shelf.
Figure 12B:
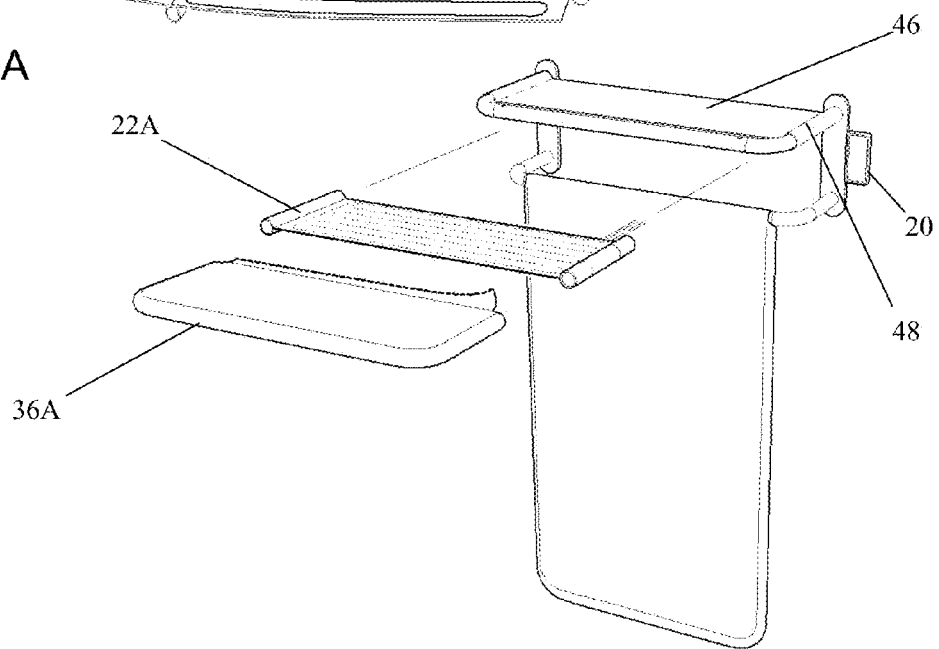
Figure 12C:
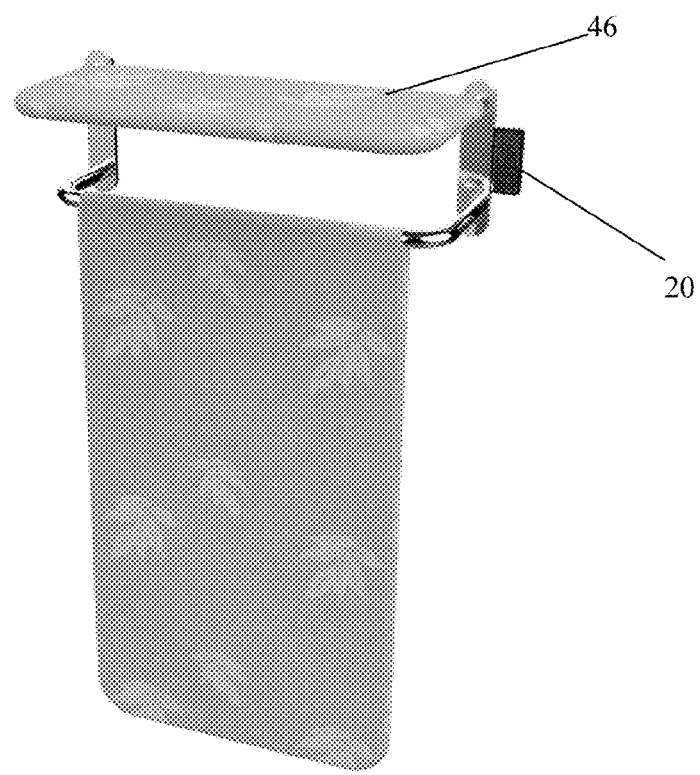
Figure 12D:

FIGS. 12A-12D illustrate an embodiment of a towel warmer 50 with a heated shelf 46. FIG. 12A is an unfolded view of the heating fabric 24A sized for the heated shelf 46 prior to folding over the shelf frame 48 of the towel warmer 50, where the side bar 48 fits through complementary loops 44A and 44B. The heated fabric sleeve 22A is then covered with shelf cover fabric 36A. The outer surface of shelf cover fabric 36A is water resistant or waterproof, and is optionally treated with antimicrobial agents. FIG. 12C illustrates an assembled towel warmer with heated shelf 46 and controller 20. FIG. 12D illustrates the towel warmer of FIG. 12C in use.

The foregoing description is illustrative of particular embodiments of the invention, but is not meant to be a limitation upon the practice thereof. The following claims, including all equivalents thereof, are intended to define the scope of the invention.

The invention claimed is:

1. A towel warmer comprising:
   a user assembly kit comprising: one or more horizontal members, one or more curved members, one or more vertical members, a plurality of fasteners collectively forming a frame assembly, and at least one of a floor stand or wall mount adapted to support said frame assembly; and
   one or more flexible heating fabric sleeves formed with fabric sheets that are sewn or joined with fasteners, zippers, or snaps into a sleeve shape, the fabric sheets having embedded electric heating wires, said one or more heating fabric sleeves adapted to circumscribe said frame assembly with the fabric sheets separated by substantially a width of said frame assembly to form a heating surface.

2. The towel warmer of claim 1 wherein each of said one or more horizontal members, one or more curved members, and said one or more vertical members are formed from a material of a metal, a plastic, or a composite type material.

3. The towel warmer of claim 1 wherein each of said one or more horizontal members, said one or more curved members, and said one or more vertical members are hollow or solid.

4. The towel warmer of claim 1 wherein each of said one or more horizontal members, one or more curved members, and one or more vertical members are joined to another of said one or more horizontal members, one or more curved members, and one or more vertical members with fasteners, press fittings, or with a snapped fitting.

5. The towel warmer of claim 1 further comprising a thermostat to regulate a resultant temperature of said heating fabric electric heating wires.

6. The towel warmer of claim 1 wherein said heating fabric electric heating wires comprise Positive Temperature Coefficient (PTC) wire.

7. The towel warmer of claim 1 wherein said one or more heating fabric sleeves have an outer surface that is water resistant or waterproof.

8. The towel warmer of claim 1 wherein said one or more heating fabric sleeves has a decorative pattern on a sleeve surface.

9. The towel warmer of claim 1 wherein said frame assembly is supported on said floor stand.

10. The towel warmer of claim 1 wherein said frame assembly is supported on said wall mount.

11. The towel warmer of claim 1 wherein said frame assembly further comprises one or more vertical racks.

12. The towel warmer of claim 1 further comprising a controller for setting operating parameters of said towel warmer that is user programmable.

13. The towel warmer of claim 12 wherein said controller further comprises a display that provides a user with the current time, temperature of the heating element, or the temperature of the ambient air within the room.

14. The towel warmer of claim 1 further comprising one or more heating shelves formed with said one or more heating fabric sleeves adapted to circumscribe said frame assembly.

15. The towel warmer of claim 1 further comprising one or more external slip covers that fit over said one or more heating fabric sleeves.

16. The towel warmer of claim 13 wherein said one or more external slip covers have a graphical design.

17. The towel warmer of claim 13 wherein said one or more external slip covers are a flexible two ply fabric with an inner layer that is water proof.

18. The towel warmer of claim 13 wherein said one or more external slip covers are treated with antimicrobial agents.

19. The towel warmer of claim 1 wherein said one or more heating fabric sleeves are treated with antimicrobial agents.

\* \* \* \* \*